(12) United States Patent
Biscarini et al.

(10) Patent No.: US 8,558,206 B2
(45) Date of Patent: Oct. 15, 2013

(54) FLEXIBLE READING DEVICE FOR TRACEABILITY OF PRODUCTS

(75) Inventors: Fabio Biscarini, Bologna (IT); Massimiliano Cavallini, Vergato (IT); Francesco Cino Matacotta, Rome (IT); Pierpaolo Greco, Bologna (IT); Serena Lanza, Bologna (IT); Pietro Mattiazzi, Padua (IT); Davide Natalini, Bologna (IT)

(73) Assignee: Scriba Nanotecnologie S.R.L., Bologna (IT)

( * ) Notice: Subject to any disclaimer, the term of this patent is extended or adjusted under 35 U.S.C. 154(b) by 282 days.

(21) Appl. No.: 13/012,265

(22) Filed: Jan. 24, 2011

(65) Prior Publication Data

US 2011/0179989 A1    Jul. 28, 2011

(30) Foreign Application Priority Data

Jan. 27, 2010    (IT) .................................. BO10A0047

(51) Int. Cl.
*G06K 7/10*    (2006.01)

(52) U.S. Cl.
USPC .......................................... 250/566; 250/235

(58) Field of Classification Search
USPC .................. 250/234–236, 566, 568, 238; 422/55–57; 374/104–106, 150–160; 235/487, 462.01
See application file for complete search history.

(56) References Cited

U.S. PATENT DOCUMENTS

| 4,898,848 A * | 2/1990 | Shibata ........................ 503/200 |
| 5,057,434 A | 10/1991 | Prusik et al. |
| 5,709,472 A * | 1/1998 | Prusik et al. .................. 374/106 |
| 7,878,410 B2 * | 2/2011 | Norrby et al. ................. 235/487 |
| 2004/0248305 A1 | 12/2004 | Vaillant |

FOREIGN PATENT DOCUMENTS

EP    0117390 A2    9/1984

OTHER PUBLICATIONS

European Patent Office European Search Report dated May 30, 2011 for EP Application No. 11152240.5.

* cited by examiner

*Primary Examiner* — Que T Le
(74) *Attorney, Agent, or Firm* — Abelman, Frayne & Schwab

(57) ABSTRACT

A flexible, digital enhanced reading device (P) comprises at least one label containing encoded information, a spatially structured element placed over the label itself, defined by a material indicating predetermined temperature level and exposure time range, and comprising a material with morphological and/or structural and/or chemical and/or physical state changing properties detectable following a predetermined heat absorption; the mentioned spatially structural element is adapted to at least partially cover determined zones of said label with dimensions between 0.01% and 100% of the surface of the label itself, and comprises molecular materials and/or polymer materials and/or liquid crystals and/or mixtures of said materials in any proportion.

8 Claims, 2 Drawing Sheets

FLEXIBLE READING DEVICE FOR TRACEABILITY OF PRODUCTS

CROSS-REFERENCE TO RELATED APPLICATIONS

This application is related to and claims priority under 35 USC §119(a) to Italian Patent Application No. BO2010A000047 filed on Jan. 27, 2010, which is incorporated by reference herein.

FIELD OF THE INVENTION

The present invention relates to a flexible, digital enhanced reading device.

In particular, the present invention is applied to products and advantageously used for the traceability of products in food, cosmetic consumer goods or pharmaceutical fields, to which the following description will make explicit reference without therefore loosing in generality, to optimally read and check the information of a digital message encoded within a label applied onto the same products by reaching a predetermined temperature or threshold temperature (hereinafter referred to as Ts for simplicity).

STATE OF THE ART

Increasingly complex, passive devices and sensors adapted to record the temperature reached by means of a label or the like applied to a product are currently known.

The time resolution of the marketed passive sensors based on labels is characterized by a gross level of approximation in terms of time, which results in useful but approximate information, where in these labels the time indication is of the brief, moderate, prolonged type.

Furthermore, the recording of the thermal history related to the specific product to which such a label is attached may not be contextualized.

Given the high cost of the currently marketed devices, which are generally based on inner microcircuits requiring to be powered by a battery, their use is generally limited to random checks by manufacturers or carriers and do not allow consumers to autonomously and freely check on their own.

Moreover, various obstacles have been found related to the diffusion of thermo-sensitive labels on consumer goods although the adoption thereof would be an unquestionable progress with regards to quality protection and traceability. Firstly, it is not possible to combine sensitivity to the thermal history of the product and to the information content of the label.

Furthermore, the currently existing systems do not allow to adjust the response of the sensor to the information contents of the label (in digital form) according to the product type. The existing thermo-sensitive labels are too expensive for mass distribution due to the complexity and low cost-effectiveness of the manufacturing process.

Moreover, in some circumstances, the labels containing electronic devices have difficulties related to the typical drawbacks of electronic circuits (e.g. resistive heating, low temperature, humidity, etc.) which may distort the response of the label to the thermal conditions of the external environment. On the other hand, the existing thermo-sensitive labels made of materials which react to temperature cannot provide a response proportioned to the characterized needs of each single product.

The availability on the market of fresh products which may be sold by measure conditions the maximum extension of the label to be applied to the product also by virtue of the primary and secondary packaging reduction principle. The integration between the various functions of the label must proceed taking into account the miniaturization and flexibility objectives of the support to ensure adhesion also to objects having curved surfaces.

Finally, no low cost labels are available, which may record the thermal gradient without the aid of electronic circuitry inside the label, which so make the label itself rigid on the plane.

SUMMARY OF THE INVENTION

It is the object of the present invention to overcome the drawbacks and problems of the prior art illustrated above.

In particular, it is the main object of the present invention to provide a flexible, digital enhanced reading device capable of recording the thermal history of a product which may be optimally decoded by means of an appropriate optical system.

Given its simplicity of construction and low cost, the use of the device object of the present invention allows mass application, and therefore direct accessibility to product quality by end consumers, the quality being conditioned by the thermal history of the product.

Thereby, the effective compliance to criteria related to product use (e.g. product lifespan), before degrading, may be checked in punctual, capillary manner, by containing the thermal history of the object itself in the consumer's hands.

BRIEF DESCRIPTION OF THE DRAWINGS

The technical features of the invention according to the aforesaid objects are clearly inferable from the content of the following claims and its advantages will be more apparent from the following detailed description made with reference to the accompanying drawings which show an embodiment thereof by way of non-limitative example only, in which:

FIG. 1b is an atomic force microscope image of the flexible device in FIG. 1a;

DETAILED DESCRIPTION OF THE INVENTION

Figure 1C:
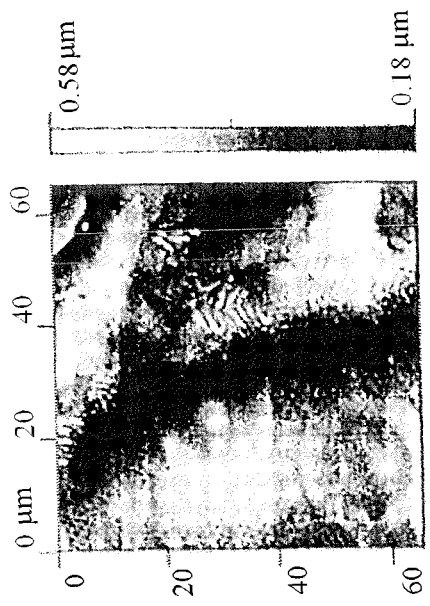
FIG. 1c shows the flexible device of the invention in another operative state.

With reference to the accompanying FIGS. 1a-1b, and 1c-1d, the flexible device shown as a whole by reference P comprises at least one label 1 containing encoded information (not shown), a spatially structured element 2, which is placed over label 1, said element 2 being defined by a predetermined material indicating predetermined temperature level and exposure time range.

Label 1 is defined by a sheet or plate or wafer or other support of arbitrary shape and curvature, and may be ether rigid or flexible.

According to the present invention, the mentioned indicating material comprises a material which has morphological and/or structural and/or chemical and/or physical state changing properties, detectable as a result of a predetermined heat absorption.

The mentioned spatially structured element 2 is adapted to at least partially cover determined zones of said label 1 with dimensions between 0.01% and 100% of the surface of the label itself, and comprises molecular materials and/or polymer materials and/or liquid crystals and/or mixtures of said materials in any proportion. Importantly, the structuring of the spatially structured element 2 is determined by molding or pressure printing or lamination or printing by rotogravure or fusion or self-organization or deposited or sublimated by means of a mask or amalgamated or mixed into the support itself.

Furthermore, the spatially structured element 2 is organized in various forms of aggregation on different scale lengths between 1 nm and 1 cm with different chemical and/or physical properties (e.g. fusion, solubility, hygroscopy, color change, surface tension, aggregation phase, order, anisotropy).

In particular, label 1 comprises a holography grating containing digitally encoded information (e.g. aztec codes, datamatrix codes or miniaturized barcodes, i.e. information containing codes with characteristic elements of size variable between 1 micrometer and 500 micrometers) by means of a modulation of the readable surface by means of a characteristic variation of the optical contrast.

On the surface of such a holography label 1 are arranged, in controlled manner and following a defined alignment, one or more of said spatially structured elements 2 (hereinafter referred to as "patches" for simplicity) of thermo-sensitive material (e.g. with a fusion point within the sensitivity degree of label 1).

By way of non-limitative example only, the mentioned thermo-sensitive materials of element 2 may be n-Pentadecane, n-Hexadecane, n-Heptadecane, n-Octacosane and the like, such as to define an overlaying film made of structured material which, as the exposure temperature of label 1 varies to a temperature equal to or higher than then modified threshold value Ts, improves the morphology and degree of readability of the underlying encoded information by varying optical properties and, in particular, transparency.

It is worth noting that the threshold temperature Ts generally varies in a range between −50° C. and 200° C. and depends on the type of thermo-sensitive material used.

Specifically, optimal and surprising results in terms of optimal readability of labels 1 were obtained in experiments with the following temperature thresholds Ts according the materials used:

with n-Pentadecane: $25° C. \leq Ts \geq 35° C.$
with n-Hexadecane: $64° C. \leq Ts \geq 74° C.$
con n-Heptadecane: $72° C. \leq Ts \geq 82° C.$
con n-Octacosane: $61° C. \leq Ts \geq 71° C.$ As shown in FIGS. 1a and 1b, the patch is first defined by at least one spatially structured element 2 with characteristic dimension comparable to that of the underlying encoded holography grating.

Figure 1D:
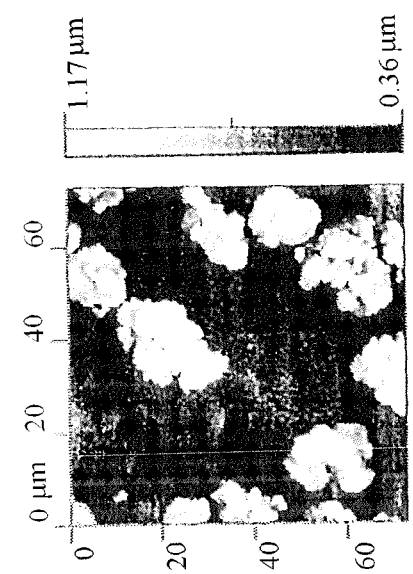
FIG. 1d is an atomic force microscope image of the flexible device shown in FIG. 1c.
Figure 1A:
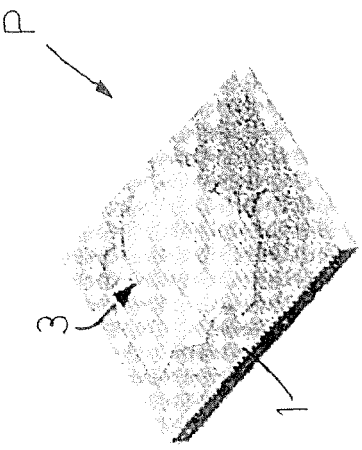
FIG. 1a shows the flexible device of the invention in an operative state.
Figure 1B:
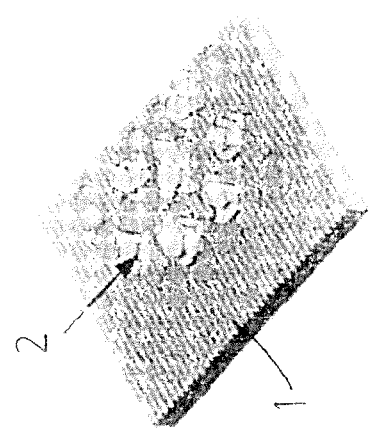

As shown in FIGS. 1c and 1d, with subsequent exposure of label 1 containing the grating to a source of heat which allows, for example, to reach the corresponding fusion or reorganizing temperature of the material, patch 2 is reorganized into a differently structured film obtaining a final patch indicated in FIG. 1d by numeral 3, which allows to read a different degree of information of the grating underneath. Such a reorganization of the spatially structured element from the initial state indicated by numeral 2 to the final state indicated by numeral 3 (see figures from 1a, 1b to 1c, 1d), occurs in finite times during which the readability of the information quantity varies, proportionally increasing (or according to another law depending on the material, the spatially structured element 2 of which is defined) according to time, thus providing optimal information on the exposure time of the label 1 itself to a temperature higher than the threshold temperature Ts.

Figure 2:
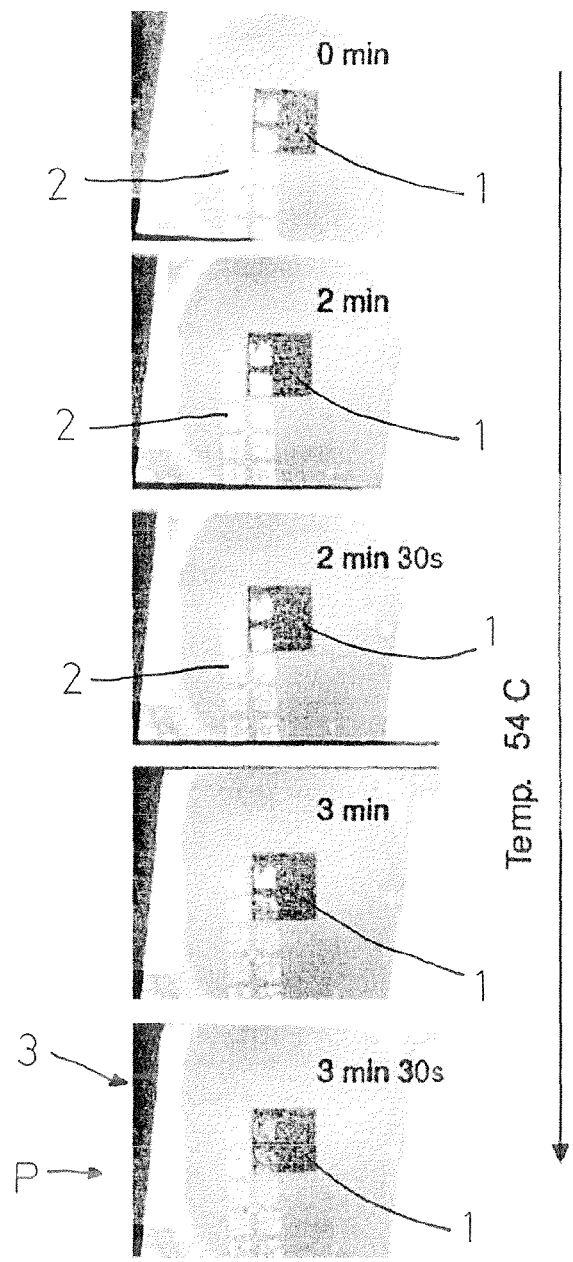
FIG. 2 is a sequence of optical images which show the flexible device in corresponding, subsequent operative states.

FIG. 2 shows how, upon a thermal treatment (here with temperature Ts=54° C.), the spatially structured element positioned over a label 1 consisting of a aztec code allows to gradually improve the readability of label 1 underneath over time. The area percentage covered by the spatially structured element 2 with respect to the holography grating of label 1 containing digitally encoded information determines the time intervals that said device P may measure, which also depend on the nature of the material of the spatially structured element 2e and of the transformation type that the mentioned material implements when it is exposed to its threshold temperature Ts.

In essence, the temperature reading is determined by the threshold temperature at which the material forming the spatially structured element is sensitive.

The exposure time to said temperature is determined through the variation of the amount of optically readable information according to the variation of the optical properties of the spatially structured element. The spatially structured element may take an irreversible variation of transparency upon the exposure to a temperature higher than the threshold temperature level of one or more structured elements.

Moreover, the spatially structured element may be exposed to the environment or protected by one or more films of calibrated thickness and thermal properties.

The final patch 3 made of thermo-sensitive material has at least one surface with structured configuration and may be modeled with any molding technique, the morphological structure of which may also be spontaneous as a result of a technological manufacturing or deposition process.

The invention claimed is:

1. A flexible device, comprising at least one label containing encoded information and a spatially structured element placed over said label, defined by a thermo-sensitive material, said spatially structural element being adapted to at least partially cover determined zones of said label, wherein, as the temperature of said device varies to a temperature equal to or higher than a threshold value, said spatially structured element varies optical properties thereof in order to improve the degree of readability of said label and of the information encoded thereon, said degree of readability proportionally increasing according to exposure time of said device to a temperature higher than said threshold value.

2. A device according to claim 1, where said thermo-sensitive materials-comprises alkanes.

3. A device according to claim 1, wherein the spatially structured element takes an irreversible variation of transparency upon the exposure to a temperature higher than the threshold value.

4. A device according to claim 1, wherein the spatially structured element comprises one or more protection films.

5. A device according to claim 1, wherein said threshold temperature value is comprised between −50° C. and 200° C.

6. A device according to claim 1, wherein, as the temperature of said device varies to a temperature equal to or higher than a threshold value, said spatially structured element varies transparency thereof in order to improve the degree of readability of said label.

7. A device according to claim 1, where said thermo-sensitive material comprises PEDOT:PSS.

8. A device according to claim 1, where said thermo-sensitive material comprises functionalized phthalocyanines.

* * * * *